June 12, 1951   W. J. CAMERON   2,556,646
PRESSURE INDICATING APPARATUS
Filed Feb. 13, 1948   2 Sheets-Sheet 1
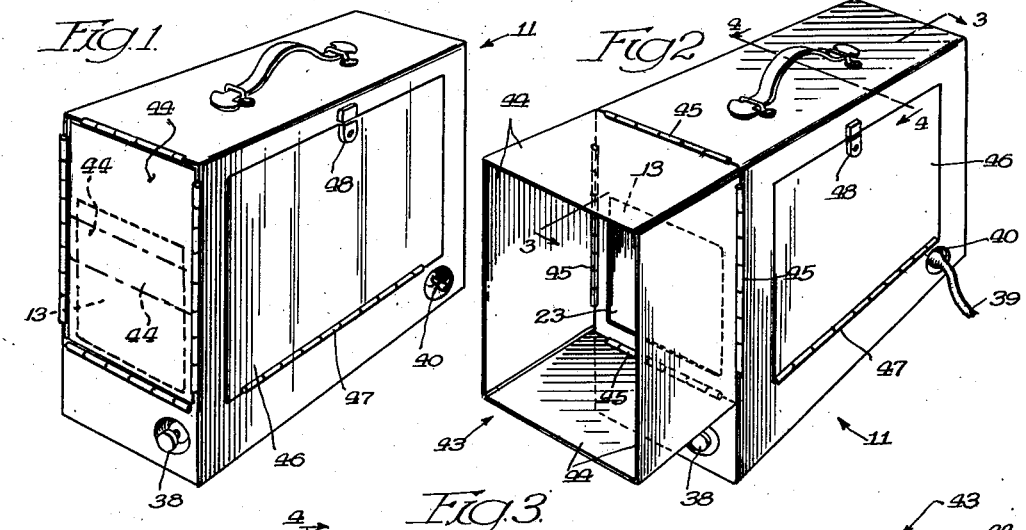
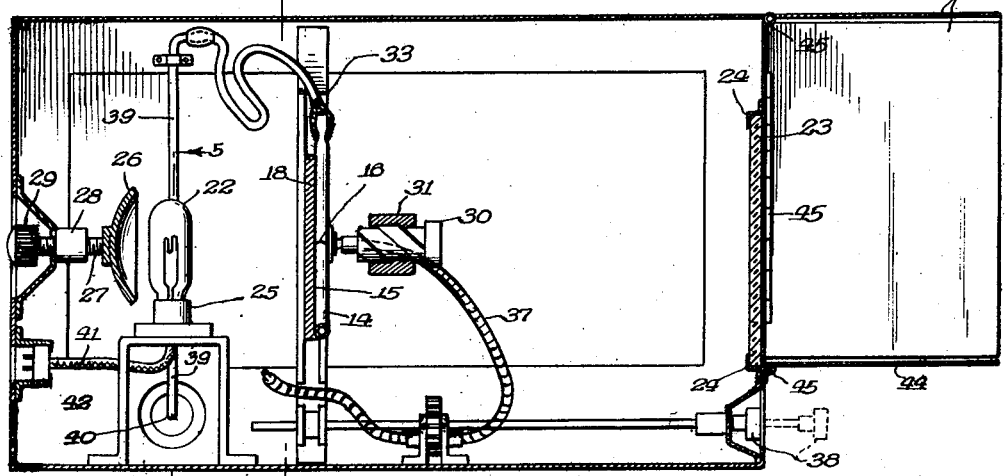
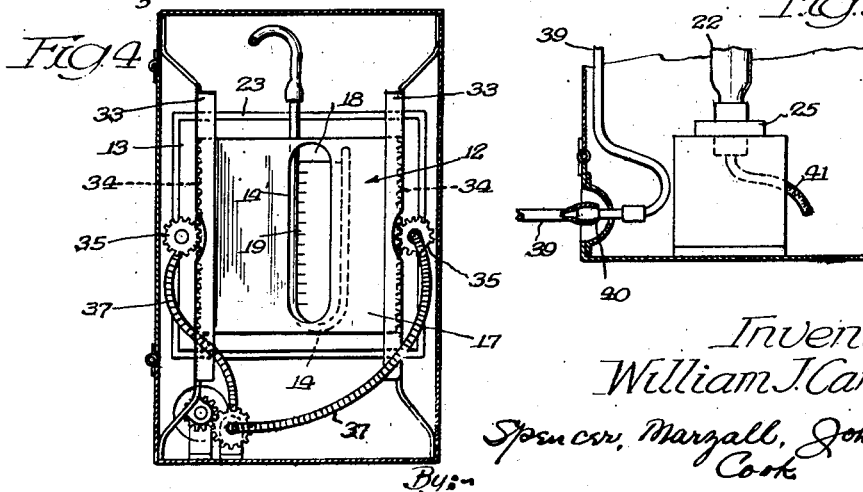
Inventor:—
William J. Cameron.
By Spencer, Marzall, Johnston & Cook
Attys

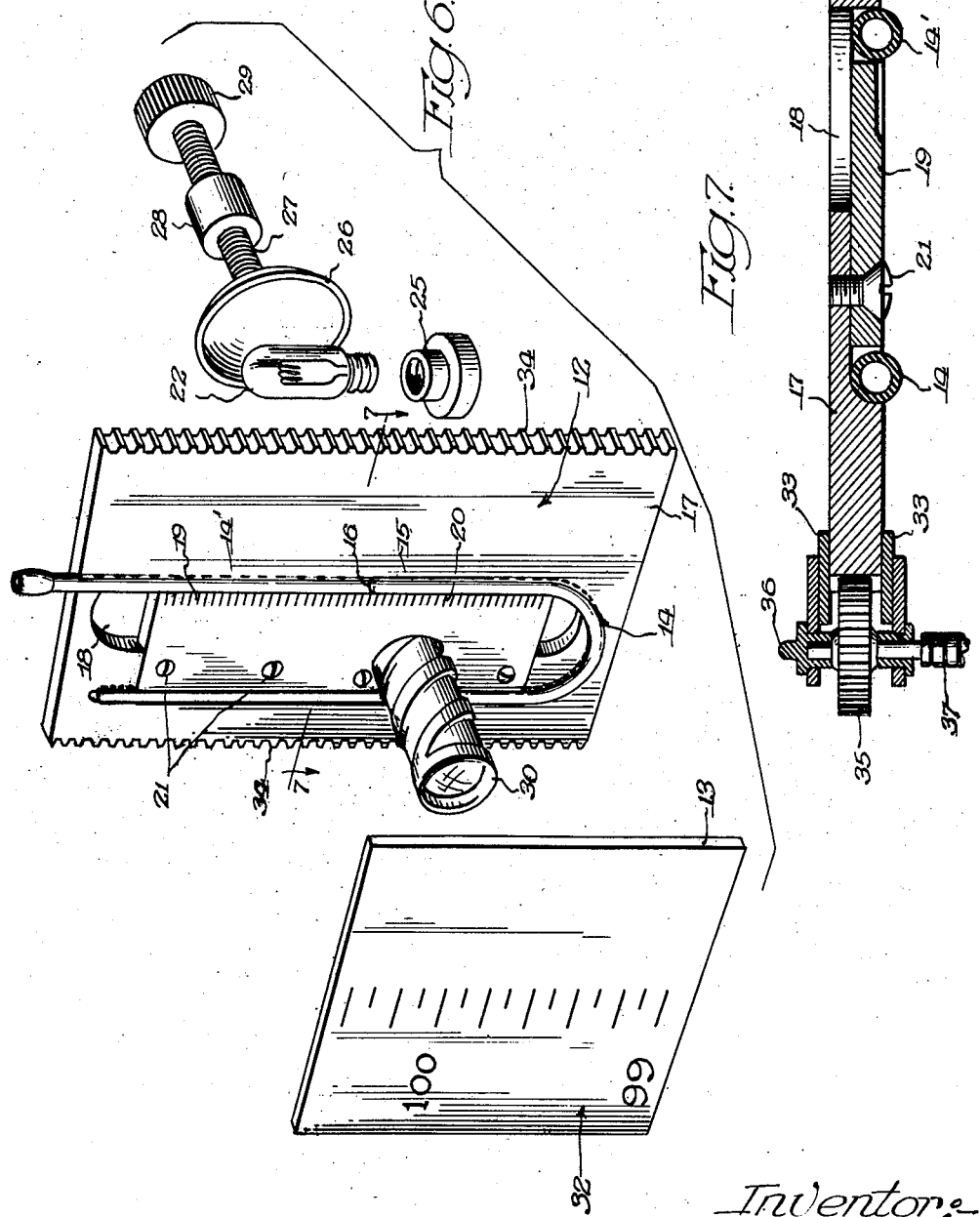

Patented June 12, 1951

2,556,646

UNITED STATES PATENT OFFICE 2,556,646

PRESSURE INDICATING APPARATUS

William J. Cameron, Chicago, Ill.

Application February 13, 1948, Serial No. 8,212

10 Claims. (Cl. 73—402)

The present invention relates in general to indicator apparatus, and has more particular reference to an improved diagnostic manometer device usable by physicians for the accurate determination of blood pressure data, including systolic and diastolic pressures.

Manometer apparatus of the character mentioned may comprise means forming a column of liquid, such as mercury, in conjunction with pressure means for applying, to the column, the blood pressure to be measured, said pressure applying means commonly comprising an inflation element connected in pressure exchange relationship with the column and with a body member, such as the arm of the subject or patient on which the blood pressure determination is made. In such apparatus, blood presures may be determined by the position of the top or meniscus of the liquid forming the column with respect to a graduated scale disposed adjacent the column. Since blood pressures vary considerably from moment to moment in a patient under observation, difficulty is encountered in determining systolic and diastolic pressures on the relatively closely calibrated scale required in manometer apparatus of useful compactness, through the difficulty of determining the position of a relatively rapidly moving meniscus against the scale.

An important object of the present invention is to provide improved manometer means, including an arrangement for magnifying the scale and column meniscus in a zone at which an accurate pressure determination is desired; a further object being to provide viewing apparatus adjustable at will to provide a magnified view of the column meniscus at any desired observation zone within the limits of the associated pressure measuring scale.

A further object is to provide an improved blood pressure apparatus on which extremely accurate pressure determinations, particularly of systolic and diastolic pressures, may be made.

Another important object resides in providing view projecting means in combination with blood pressure manometer apparatus, whereby a magnified view of the liquid meniscus of the manometer indicating column and its associated measuring scale may be obtained for accurate observation; a further object being to provide projection apparatus embodying a light source and a projecting lens for projecting an enlarged view of the manometer column and its associated scale, and an observation screen, preferably of ground glass or similar screen material, for receiving the enlarged and projected image; a still further object being to form the manometer column and its associated scale of transparent material for projection of an enlarged image thereof by means of light rays passing therethrough from a suitable source to the observation screen.

Another important object is to provide improved blood pressure apparatus having image enlarging and projecting means as a compact assembly adapted to occupy a minimum amount of space, and thereby well suited for service as a piece of equipment for a practicing physician.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of apparatus embracing the present invention, the same being shown in collapsed position for convenient storage or transportation;

Fig. 2 is a perspective view of the apparatus in condition set up for operation;

Figs. 3, 4, and 5, respectively, are sectional views taken substantially along the lines 3—3, 4—4, and 5—5 in Figs. 2 and 3;

Fig. 6 is a perspective view of the component parts of the apparatus; and

Fig. 7 is a sectional view taken substantially along the line 7—7 in Fig. 6.

To illustrate the invention, the drawings show blood pressure apparatus comprising a main frame 11 preferably forming a closed housing providing a mounting for a blood pressure manometer 12, a viewing screen 13, and projection means for projecting an enlarged image of the manometer device upon the screen for viewing purposes.

To this end, as shown more particularly in Fig. 6, the manometer device may comprise a preferably U-shaped tube 14 of glass, or other transparent material, containing a pressure liquid, such as mercury, in the tube, including a pressure indicating mercury column 15 extending in a leg 14' of the tube and having a meniscus 16 defining the top of said column in said leg. The tube is mounted on a support panel 17 formed with an elongated opening 18 extending substantially at the center of the panel, the tube 14 being secured to the panel with said leg 14' extending in said opening 18, as along one edge of said opening. The panel 17 also supports a measuring scale 19, the same preferably comprising a strip of transparent material formed with preferably opaque graduation marks 20 disposed along an edge thereof, said strip being mounted on the board, at the edge of the opening 18, remote from the leg 14' of the tube, as by means of fastening screws 21, to dispose said strip with its graduated edge extending adjacent and parallel with the tube leg 14'.

The tube leg 14' and the adjacent graduated edge of the scale strip 19 thus extend in the opening 18 in position such that an image of the strip and of the leg 14 may be projected upon the viewing screen 13, as by means of a lamp 22 suitably mounted on the main frame 11 within the housing, said lamp and the viewing screen being preferably disposed on opposite sides of the panel 17. To this end, the housing formed by the main frame 11 may be provided, at one end, with an opening 23 forming a window in which the screen 13 may be mounted in any suitable or preferred fashion, as by means of the support brackets 24.

The viewing screen, of course, may comprise any suitable or preferred translucent material, such as a plate of so-called opalescent or ground glass, or a sheet of transparent plastic, sandblasted or otherwise treated or formed to provide so-called "frosted" light transmitting characteristics. By projecting an image of the leg 14' and of the scale strip 19, upon the inwardly facing surface of the screen 13, by means of light emitted by the lamp 22, the projected image may be readily viewed on the screen 13 from outwardly of the housing 11. The lamp 22 may be mounted in fixed position within the housing 11 by providing a suitable lamp support base 25 mounted on the frame within the housing on the side of the panel 17 remote from the screen 13; a suitable reflecting mirror 26 being preferably mounted in the housing behind the lamp in order to reflect light emanating from the lamp and project the same through the manometer leg 14' and the scale strip 19, and onto the viewing screen 13. This reflector may be conveniently supported on a screw threaded stem 27 carried in and extending through a bushing 28, mounted on the wall of the housing 11 opposite from the housing wall on which the screen 13 is supported. The stem 27 thus may have an end extending outwardly of the housing 11 and provided with a handle 29, by which the stem may be adjusted in the threaded bushing or nut 28 in order to adjust the mirror 26 toward and away from the lamp 22.

In order to magnify the projected image of the manometer leg 14' and of the scale strip 19, a projecting lens 30 may be mounted within the housing 11, as on a suitable support bracket 31. The bracket and lens may be threadedly interconnected for focusing the lens on the screen. The bracket 31 is preferably arranged to support the projecting lens 30 in position between the panel 17 and the viewing screen 13, with the axis of the projecting lens extending in a direction normal to the plane of the viewing screen and substantially in alinement with the centers of the viewing screen 13 and of the lamp and reflecting mirror, the line of contact of the manometer leg 14' and the graduated edge of the scale strip 19 also preferably lying in a vertical plane which includes the axis of the projecting lens 30.

With such an arrangement, the portions of the leg 14' and of the scale strip 19 at and adjacent the intersection thereof with the longitudinal axis of the projecting mirror, will be projected as an enlarged image 32 upon the viewing screen whenever the lamp 22 is energized. When the device is in operation for blood pressure determination, the portions of the leg 14' requiring observation are those portions containing the meniscus 16 which defines the top of the mercury column in the leg of the manometer. Since the meniscus may require observation at any point within the longitudinal range of the measuring scale 19, means is provided for adjustably shifting the panel 17, and the manometer and scale thereon vertically with respect to the longitudinal axis of the projecting lens, in order to dispose any desired portion of the leg and scale, requiring observation, in alinement with the axis of the projecting lens, so that such portion requiring observation will be projected upon the screen 13.

To this end, the panel 17 may be supported at its opposite edges in guideways 33, which may conveniently form a portion of the housing 11. The guideways are arranged to support the panel 17 for vertical movement in either direction through an adjustable displacement sufficient to allow any portion of the graduated scale 19 and adjacent manometer leg 14' to be brought into registration with the axis of the projecting lens. The panel 17 also is provided with vertical rack means 34 in position, as at a side edge or edges of the panel, or elsewhere on the panel, to engage a driving pinion or pinions 35 carried on stems 36 suitably journalled on the main frame 11. These stems 36 are drivingly connected in any preferred fashion, as by means of rigid or flexible driving members 37, with an adjusting knob 38 preferably disposed in readily operable position and conveniently accessible to the hand of a person in position to view the projected image 32 on the screen 13.

The upper end of the manometer leg 14' may be formed for connection with the end of a usually flexible conduit member 39 which may extend, as through a suitable fitting 40 in the wall of the housing 11, for connection as with an inflation device, or other pressure transmitting means, for applying blood or other pressures to be measured on the manometer. More particularly, the connecter 39 may extend to an inflation device of the wrap-around type commonly used by physicians on the arm of a patient for blood pressure determination.

The lamp base 25 may, of course, be provided with any suitable electrical conductors 41 to a connection socket 42 mounted in any convenient position on the housing 11 to receive a corresponding socket connecter at one end of a conductor cable, the opposite end of which may be provided with a plug adapted for interconnection in any suitable electrical power outlet, as commonly employed in electric power distribution systems. If desired, a control switch may be incorporated either in the conductor cable or in the conductors 41 which extend between the lamp base 25 and the connecting socket 42, in which case the control switch may, if desired, be mounted on the walls of the housing 11, as adjacent the connecting socket 42, in position readily accessible to the operator of the apparatus.

In order to increase the visibility of the image 32 projected on the viewing screen 13, hood means 43 may be provided around the opening 23 in order to shield the outer surface of the viewing screen 13 from external light. The hood means 43 may take any suitable or preferred form, although, as shown, the same may conveniently comprise collapsible flaps 44, including rectangular panels hinged as at 45 on the housing 11, in position to fold down one upon the other over the window opening 23, to thereby cover said opening and the viewing screen therein when the device is not in use, as shown in Fig. 1. By swinging the flaps 44 outwardly to uncover the window opening and viewing screen, the same, as shown in Fig. 2, may be arranged and secured by suitable latches in rectangular box-like arrangement to form a viewing hood around the viewing screen, said screen being visible through the open end of said box-like hood.

If desired, a carrying handle may be provided at the top of the housing 11, and a wall of the housing may be provided with a door 46, hinged as at 47, and latched as at 48, to give access to the interior for adjustment, repairs, or replacement of parts. If desired, also, the top of the housing may be provided with a transverse slot-like opening, normally closed as by means of a suitable cover, through which opening the panel 17 may be assembled in operative position in the guides 33, and through which opening the panel may be removed from the housing for inspection, repair, and replacement, when necessary.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Blood pressure indicating apparatus comprising a viewing screen, an enlarging lens and a lamp forming a light source in position to direct a beam of light upon said viewing screen, pressure responsive means comprising a manometer having a tubular leg of transparent material containing a liquid pressure-responsive medium, means forming a scale comprising relatively opaque graduations disposed longitudinally of said manometer leg, and means to adjustably mount said transparent leg and scale, in said light beam, for vertical movement in the direction of said manometer leg, transversely of said light beam, said enlarging lens being mounted between said manometer leg and the viewing panel, with the longitudinal axis of the lens extending in line with said light source and substantially at right angles with respect to said viewing screen, whereby to project, upon the viewing screen, an enlarged image of the portions of said manometer leg and scale disposed in the vicinity of the axis of said lens.

2. Blood pressure indicating apparatus comprising a viewing screen, an enlarging lens and a lamp forming a light source in position to direct a beam of light upon said viewing screen, pressure responsive means comprising a manometer having a tubular leg of transparent material containing a liquid pressure-responsive medium, means forming a scale comprising relatively opaque graduations disposed longitudinally of said manometer leg, means to mount said transparent leg and scale in said light beam, said enlarging lens being mounted between said manometer leg and the viewing panel, with the longitudinal axis of the lens in line with said light source and substantially at right angles with respect to said viewing screen, whereby to project, upon the viewing screen, an enlarged image of the portions of said manometer leg and scale disposed in the vicinity of the axis of said lens, means operable to adjust said leg and scale vertically with respect to the axis of said lens, and means for applying a pressure to be indicated to said manometer.

3. Indicating apparatus comprising a viewing screen, a lamp forming a light source in position to direct a beam of light upon said viewing screen, pressure responsive means comprising a manometer having a tubular leg of transparent material containing a liquid pressure-responsive medium, a support panel of opaque material formed with an elongated slot, means to mount said manometer on said panel with said transparent leg disposed in said slot, a gauging strip of translucent material having graduated portions formed with relatively opaque graduations thereon, said strip being mounted on said panel in position presenting the graduated portions of the strip in said slot and alongside of said manometer leg, means for mounting said support panel between said viewing screen and light source, with said manometer leg and strip in said beam of light, an enlarging lens mounted between said support and viewing panels, with the longitudinal axis of the lens extending in line with said light source and substantially at right angles with respect to said viewing screen, whereby to project, upon the viewing screen, an enlarged image of the portions of said manometer leg and gauging strip disposed in the vicinity of the axis of said lens, and means for adjusting said support panel vertically with respect to the axis of said lens.

4. Indicating apparatus comprising a frame forming an enclosed housing, a translucent viewing screen at one end and visible from outside of said housing, a lamp at the opposite end of and within said housing and forming a light source in position to direct a beam of light upon said viewing screen, pressure responsive means comprising a manometer having a tubular leg of transparent material containing a liquid pressure-responsive medium, a support panel of opaque material formed with an elongated slot, means to mount said manometer on said panel with said transparent leg disposed in said slot, a gauging strip of translucent material, having graduated portions formed with relatively opaque graduations thereon, said strip being mounted on said panel in position presenting the graduated portions of the strip in said slot and alongside of said manometer leg, means for mounting said support panel in said housing for adjustable vertical movement in the direction of said manometer leg, with said gauging strip and leg lying substantially on opposite sides of the plane intersecting the center of said light source and extending normal to said viewing panel, and an enlarging lens mounted in said housing between said support and viewing panels, with the longitudinal axis of the lens in line with said light source and substantially at right angles with respect to said viewing screen, whereby to project, upon the viewing screen, an enlarged image of the portions of said manometer leg and gauging strip disposed in the vicinity of the axis of said lens.

5. Indicating apparatus comprising a frame forming an enclosed housing, a translucent viewing screen at one end and visible from outside of said housing, a lamp at the opposite end of and within said housing and forming a light source in position to direct a beam of light upon said viewing screen, pressure responsive means comprising a manometer having a tubular leg of transparent material containing a liquid pressure-responsive medium, a support panel of opaque material formed with an elongated slot, means to mount said manometer on said panel with said transparent leg disposed in said slot, a gauging strip of translucent material, having graduated portions formed with relatively opaque graduations thereon, said strip being mounted on said panel in position presenting the graduated portions of the strip in said slot and alongside of said manometer leg, means for mounting said support panel in said housing for adjustable vertical movement in the direction of said manometer leg, with said gauging strip and leg lying substantially on opposite sides of the plane intersecting the center of said light source and extending normal to said viewing panel, an enlarging lens mounted in said housing between said support and viewing panels, with the longitudinal axis of the lens in line with said light source and substantially at right angles with respect to said viewing screen, whereby to project, upon the viewing screen, an enlarged image of the portions of said manometer leg and gauging strip disposed in the vicinity of the axis of said lens, and means forming a screening hood around said viewing screen.

6. Indicating apparatus comprising a frame forming an enclosed housing, a translucent viewing screen at one end and visible from outside of said housing, a lamp and reflector at the opposite end of and within said housing and forming a light source in position to direct a beam of light upon said viewing screen, pressure responsive means comprising a manometer having a tubular leg of transparent material containing a liquid pressure-responsive medium, a support panel of opaque material formed with an elongated slot, means to mount said manometer on said panel with said transparent leg disposed in said slot, a gauging strip of translucent material, having graduated portions formed with relatively opaque graduations thereon, said strip being mounted on said panel in position presenting the graduated portions of the strip in said slot and alongside of said manometer leg, means for mounting said support panel in said housing with said gauging strip and leg lying in the path of said light beam, an enlarging lens mounted in said housing between said support and viewing panels, with the longitudinal axis of the lens in line with said light source and substantially at right angles with respect to said viewing screen, whereby to project, upon the viewing screen, an enlarged image of the portions of said manometer leg and gauging strip disposed in the vicinity of the axis of said lens, and means manually operable from screen viewing position for adjusting said support panel vertically with respect to the axis of said lens to dispose any desired portion of said leg and gauging strip in position for projection on the viewing screen.

7. Indicating apparatus comprising a frame forming an enclosed housing, a translucent viewing screen at one end and visible from outside of said housing, a lamp and reflector at the opposite end of and within said housing and forming a light source in position to direct a beam of light upon said viewing screen, pressure responsive means comprising a manometer having a tubular leg of transparent material containing a liquid pressure-responsive medium, a support panel of opaque material formed with an elongated slot, means to mount said manometer on said panel with said transparent leg disposed in said slot, a gauging strip of translucent material, having graduated portions formed with relatively opaque graduations thereon, said strip being mounted on said panel in position presenting the graduated portions of the strip in said slot and alongside of said manometer leg, means for mounting said support panel in said housing with said gauging strip and leg lying in the path of said light beam, an enlarging lens mounted in said housing between said support and viewing panels, with the longitudinal axis of the lens in line with said light source and substantially at right angles with respect to said viewing screen, whereby to project, upon the viewing screen, an enlarged image of the portions of said manometer leg and gauging strip disposed in the vicinity of the axis of said lens, means manually operable from screen viewing position outwardly of the housing for adjusting said support panel vertically with respect to the axis of said lens, means for applying a pressure to be indicated to said manometer, and means forming a screening hood around said viewing screen.

8. Blood pressure indicating apparatus comprising a viewing screen, an enlarging lens and a lamp forming a light source in position to direct a beam of light upon said viewing screen, pressure responsive means comprising a manometer having a tubular leg of transparent material containing a liquid pressure-responsive medium, means forming a scale comprising relatively opaque graduations disposed longitudinally of said manometer leg, and means to adjustably mount said transparent leg and scale, in said light beam, for vertical movement in the direction of said manometer leg, transversely of said light beam, said enlarging lens being mounted between said manometer leg and the viewing panel, with the longitudinal axis of the lens extending in line with said light source and substantially at right angles with respect to said viewing screen, whereby to project, upon the viewing screen, an enlarged image of the portions of said manometer leg and scale disposed in the vicinity of the axis of said lens, said manometer being mounted on a panel, guides for the opposite edges of the panel, rack means on said panel, pinion means drivingly engaging said rack means, and a manually operable handle drivingly connected with the pinion for turning the same to adjust the manometer vertically in the light beam.

9. Blood pressure indicating apparatus comprising a viewing screen, an enlarging lens and a lamp forming a light source in position to direct a beam of light upon said viewing screen, pressure responsive means comprising a manometer having a tubular leg of transparent material containing a liquid pressure-responsive medium, means forming a scale comprising relatively opaque graduations disposed longitudinally of said manometer leg, and means to adjustably mount said transparent leg and scale, in said light beam, for vertical movement in the direction of said manometer leg, transversely of said light beam, said enlarging lens being mounted between said manometer leg and the viewing panel, with the longitudinal axis of the lens extending in line with said light source and substantially at right angles with respect to said viewing screen, whereby to project, upon the viewing screen, an enlarged image of the portions of said manometer leg and scale disposed in the vicinity of the axis of said lens, the viewing screen being provided with a hood comprising hinged plates adapted to fold down one upon the other and upon the viewing screen to cover the same when not in use.

10. Blood pressure indicating apparatus comprising a viewing screen, an enlarging lens and a lamp forming a light source in position to direct a beam of light upon said viewing screen, pressure responsive means comprising a manometer having a tubular leg of transparent material containing a liquid pressure-responsive medium, means forming a scale comprising relatively opaque graduations disposed longitudinally of said manometer leg, and means to adjustably mount said transparent leg and scale, in said light beam, for vertical movement in the direction of said manometer leg, transversely of said light beam, said enlarging lens being mounted between said manometer leg and the viewing panel, with the longitudinal axis of the lens extending in line with said light source and substantially at right angles with respect to said viewing screen, whereby to project, upon the viewing screen, an enlarged image of the portions of said manometer leg and scale disposed in the vicinity of the axis of said lens, the enlarging lens being adjustable to focus the image of the manometer leg and scale sharply on the screen, an adjustable reflector for said lamp, the apparatus being enclosed in a portable housing provided with doors giving access into the housing for adjustment, repair, or replacement of the apparatus therein.

WILLIAM J. CAMERON.

REFERENCES CITED

The following references are of record in the file of this patent:

FOREIGN PATENTS

| Number | Country | Date |
| --- | --- | --- |
| 403,687 | Great Britain | Dec. 18, 1933 |